United States Patent [19]

Gutmann et al.

[11] 3,742,038

[45] June 26, 1973

[54] POLYENE COMPOUNDS

[75] Inventors: Hugo Gutmann; Ulrich Schwieter, both of Reinach, Switzerland

[73] Assignee: Hoffmann-La Roche Inc., Nutley, N.J.

[22] Filed: Jan. 14, 1971

[21] Appl. No.: 106,575

Related U.S. Application Data

[62] Division of Ser. No. 608,487, Jan. 11, 1967, Pat. No. 3,577,464.

[52] U.S. Cl............. 260/488 H, 99/19, 99/28, 99/85, 99/103, 99/118 F, 99/130, 99/134 R, 99/136, 99/139, 99/148, 260/491, 260/599, 260/601 R, 260/602, 260/615
[51] Int. Cl...... C07c 47/26, C07c 69/14, C07f 9/54
[58] Field of Search.................. 260/488 HI, 599, 260/602

[56] References Cited
UNITED STATES PATENTS

| | | | |
|---|---|---|---|
| 2,797,237 | 6/1957 | Birbeglia | 260/488 |
| 2,974,170 | 3/1961 | Kimel | 260/488 |
| 3,401,193 | 9/1968 | Farressey | 260/488 |

Primary Examiner—Lorraine A. Weinberger
Assistant Examiner—Vivian Garner
Attorney—Samuel L. Welt, Jon S. Saxe, Bernard S. Leon, William H. Epstein and George M. Gould

[57] ABSTRACT

Conjugated polyene dialdehyde compounds having 14-44 carbon atoms and mixtures thereof which are useful as coloring agents for foodstuffs, pharmaceutical preparations and cosmetic preparations and a method for preparing these dialdehydes including various intermediates in this method. This method is carried out by reacting a phosphonium salt of a conjugated aliphatic olefine having a terminal aldehyde radical with a conjugated aliphatic olefine having a terminal acetal linkage radical and a terminal aldehyde radical and thereafter hydrolyzing the reaction product to produce the dialdehyde. This dialdehyde may be further chain lengthened by reacting this dialdehyde with a phosphonium salt of a conjugated olefine having a terminal aldehyde radical, or by reacting with a vinyl ether or propenyl ether.

4 Claims, No Drawings

POLYENE COMPOUNDS

CROSS REFERENCE TO RELATED APPLICATION

This application is a division of U.S. Pat. application Ser. No. 608,487, filed Jan. 11, 1967 now U.S. Pat. No. 3,577,464.

BACKGROUND OF THE INVENTION

This invention relates to coloring agents and the use of these coloring agents in coloring materials such as foodstuffs, pharmaceuticals and cosmetics. This invention also relates to a method of producing these coloring agents including intermediates in the preparation thereof.

Of the pigments of natural or synthetic origin which are suitable for coloring foodstuffs, β-carotene and the apocarotenals derived from natural pigments have been found to be particularly useful. However, various disadvantages impose a limit on the general use of these pigments. This is seen by the fact that the color tones achieved with these pigments lie within a relatively narrow range which extends from yellow-orange to yellow red. Intermediate tones, can of course, be obtained by mixing various components. However, such mixtures of pigments are not color-constant when, as is frequently the case, the individual components are unstable or differentially stable. These pigments also vary their color with increasing dilution. In the case of carotene, for example, an undesirable color-shift to a pale yellow is observed with decreasing concentration. The desired saturated tints may often only be achieved by high concentrations, which are associated with high costs and are therefore uneconomical.

SUMMARY OF THE INVENTION

In accordance with this invention, it has been found that when polyene dialdehyde compounds of the formula:

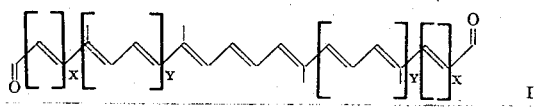

where X is an integer from 0 to 1, Y is an integer from 0 to 3 with the proviso that the sum of X and Y is an integer of at least one, or mixtures thereof when incorporated into foodstuffs, including beverages, pharmaceutical preparations and cosmetic preparations impart a wide variety of colors to these materials and do not possess many of the disadvantages which are present with regard to β-carotene and the apocarotenals derived from natural pigments. The dialdehyde compounds in accordance with this invention range from C 14 dialdehydes to C 44 dialdehydes and range in color from yellow to violet. The lower members of this series of compounds are colored intensive yellow, orange and raspberry red and the higher members are colored ruby red and violet. Hence, these new compounds extend the very small range of foodstuff pharmaceutical and cosmetic colors in a manner that has not been achieved by the known coloring compounds.

Furthermore, these compounds have a high degree of stability and are distinguished from other food coloring substances with related color properties by the fact that their pigment or coloring character is not influenced by the concentration of the compound in a solution. Solutions of these substances or compounds surprisingly retain their tint unvaried even when these compounds are greatly diluted. The compounds of formula I are therefore suitable in an outstanding manner for coloring foodstuffs, pharmaceutical and cosmetic preparations.

In accordance with this invention, it has been found that two new compounds which fall under the compounds of formula I above, i.e., 4,8,12,17,21,25-hexamethyl-octacosa-tridecaene-(2,4,6,8,10,12,14,16,18,20,22,24,26)-dial-(1,28), (a C34 dialdehyde) and 2,6,10,14,19,23,27,31-octamethyl-dotriaconta-pentadecaene-(2,4,6,8,10,12,14,16,18,20,22,24,26,28,30)-dial-(1,32), (a C40 dialdehyde) respectively impart a violet color to foodstuffs, pharmaceuticals and cosmetics into which these compounds are incorporated. Among other compounds within formula I, 4,9-di-methyl-dodeca-pentaene-(2,4,6,8,10)-dial-(1,12), (C14 dialdehyde) imparts to foodstuffs, pharmaceuticals, cosmetics an intensively lemon-yellow pigment, whereas 2,6,10,15,19,23-hexamethyl-tetracosaundecaene-(2,4,6,8,10,12,14,16,18,20,22)-dial-(1,24), (C 30 dialdehyde) imparts a red color.

Furthermore, in accordance with this invention, the coloring agents of formula I above are prepared by reacting the phosphonium salt of the formula:

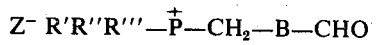

wherein R', R" and R''' are selected from the group consisting of aryl radicals containing from six to 16 carbon atoms, aralkyl radicals containing from seven to 16 carbon atoms and alkyl radicals containing from one to 16 carbon atoms, Z is an anion of a mineral acid and B is a conjugated olefinic radical containing from four to 14 carbon atoms and at least one methyl side chain, with an organic aldehyde of the formula:

$$O=OH-B_1-CH(OR_1)_2$$

wherein $R_1$ is a lower alkyl radical and $B_1$ is a conjugated olefinic radical containing from four to 14 carbon atoms and at least one methyl side chain, and thereafter hydrolyzing this reaction product to form a dialdehyde of the formula:

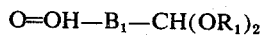

wherein B and $B_1$ are as above.

This dialdehyde can further react, if desired, with at least 2 moles of the phosphonium salt of the formula:

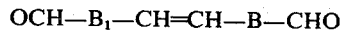

wherein Z, R', R" and R''' are as above and $B_2$ is a conjugated olefinic radical containing from four to 14 carbon atoms and at least one methyl side chain, or, according to another alternative, with a vinyl ether or propenyl ether to produce a conjugated polyene dialdehyde of a high molecular weight.

DETAILED DESCRIPTION

The coloring agents of formula I above, in accordance with this invention, can be used to color any conventional foodstuff including beverages, fruits, vegetable preserves, marmalades, cream foods, confectionary, edible fats, cheese, fish products, pasta, soup powders, etc. Any conventional pharmaceutical preparation can be colored by compounds of formula I. Among the typical pharmaceutical preparations which can be colored in accordance with this invention are included dragees, suppositories, gelatin capsules and syrups. Also any conventional cosmetic preparation can be colored with the compounds of formula I above. Among the conventional cosmetic preparations which can be colored in accordance with this invention are included, toothpaste, skin creams, lipsticks and non-alcoholic mouthwashes.

In coloring materials such as foodstuffs, cosmetic and pharmaceutical preparations, the compounds of formula I above should be added to the material in an amount sufficient to impart a color to the material. Generally, it is preferred that the foodstuff, pharmaceutical and cosmetic preparation contain from about 0,0000001 parts by weight to about 0,1 parts by weight of compound of formula I above based on the weight of the foodstuff, pharmaceutical and cosmetic preparation. It is suitable to make the amount of compounds of formula I to be added dependent on the nature of the preparations to be colored. Thus, for coloring foodstuffs, it is advantageous to add from about 0,0000001 parts by weight to about 0,0001 parts by weight of compound of formula I based on the weight of the preparation (e.g. about 0,000002 parts by weight to about 0,000005 parts by weight are used for coloring beverages, such as carbonated orange beverages, about 0,00001 parts by weight to about 0,000025 parts by weight are used for coloring ice creams, confectionary etc. and 0,00001 parts by weight to about 0,00005 parts by weight are used for coloring yoghurts). In the cosmetic field preferably about 0,0000001 parts by weight to about 0,05 parts by weight of compound of formula I are used based on the weight of the cosmetic preparation (e.g. from about 0,001 parts by weight to about 0,05 parts by weight are used for coloring lipsticks and from about 0,0000001 parts by weight to about 0,00002 parts by weight are used for coloring creams, such as skin creams, toothpaste etc.). Pharmaceutical preparations, such as suppositories and syrups preferably contain from about 0,000005 parts by weight to about 0,001 parts by weight based on the weight of the preparation. In case of coloring dragees, the coating suitably contains from about 0,001 mg to about 0,1 mg of compound of formula I per cm² surface of the dragees. Although greater amounts than the parts by weight of the compound of formula I specified above can be incorporated into the foodstuff, pharmaceutical or cosmetic preparation, however, these high amounts are seldom utilized since no additional benefits, as far as color is concerned, is obtained by utilizing such large amounts of the compounds of formula I above.

The polyene compounds of formula I can be employed for coloring foodstuffs, pharmaceutical and cosmetic preparations both in the original crystalline form and in a particular water-soluble form.

The polyene compounds of formula I above can chiefly be used in the crystalline form for coloring fats and oils, as well as fat-containing substances such as, for example, marzipan, suppositories, lipsticks. The polyene compounds of formula I above, can, for example, be dissolved in oils without further ado. Prior to the addition of the pigment, hard or soft fats are conveniently liquified by heating. Brushable fats may also be colored by kneading-in an oil pigment-solution. Marzipan, which for example, is thoroughly kneaded with a solution of the polyene compound of formula I in almond oil, can also be colored in the same way. Colored suppositories and lipsticks can, for example, be manufactured in such a way that the polyene compound used as the pigment is stirred into the liquified carrier mass prior to filling into the molds.

For coloring fat-poor or fatless substances, there is generally used a water-dispersible form of the polyene compounds of formula I. The preparation of these compounds in water-dispersible form can be carried out by any of the techniques disclosed in U. S. Pat. No. 2,861,891, Bauernfeind et al. and U. S. Pat. No. 3,110,598, Muller et al. These include dissolving the polyene compounds of formula I in a suitable solvent, homogenizing the solution (together with a stabilizer and a solubilizing or emulsifying agent if required, as well as with an animal or vegetable fat if desired) with water in the presence of a protecting colloid and evaporating the emulsion formed to dryness under reduced pressure.

Any conventional organic solvent capable of dissolving the compound of formula I above, can be utilized. These solvents include volatile halogenated hydrocarbons such as, for example, chloroform, carbon tetrachloride, methylene chloride, etc. Any conventional antioxidatively active stabilizers can be utilized. These antioxidants include tocopherols, 2,6-ditertbutyl-4-hydroxytoluene [BHT], butyl-hydroxyanisole [BHA].

The salts of fatty acid esters of ascorbic acid (e.g. the sodium salt of ascorbyl palmitate), inter alia, have been found to be active as solubilizing agents. Any of the conventional solubilizing agents can be utilized in accordance with this invention. Concerning emulsifying agents, any conventional emulsifying agent can be utilized in accordance with this invention. The polyoxyethylene derivatives of sorbitan anhydrides partially esterified with fatty acids [Tweens] or non-ionogenic derivatives of fatty compounds with polyoxyethylene derivatives [Cremophores] are, for example, usable. The protecting colloids in which the compounds of formula I are emulsified or dispersed include any of the conventional water soluble gelable colloids. Gelatin, dextrin, pectin, tragacanth, guar (especially in the presence of saccharose, glycerin, sorbitol), have, for example, been found to be useful as protecting colloids. The color brilliance of the aqueous solutions can be increased by the addition of any animal fat (e.g. beef tallow) or vegetable oil (e.g. groundnut oil).

The C 14 to C 44 dialdehydes of this invention can be prepared by building up the molecule through chain-lenghthening of suitable aldehydes. The lowest member 4,9-dimethyl-dodeca-pentaene-(2,4,6,8,10)-dial-(1,12) [C 14-dialdehyde] is obtained by the condensation of 2,7-dimethyl-octa-triene-(2,4,6)-dial-(1,8)-diacetal with two moles of vinyl ether.

In general, the dialdehydes of formula I above can be prepared by building through chain lengthening by means of the following reaction scheme:

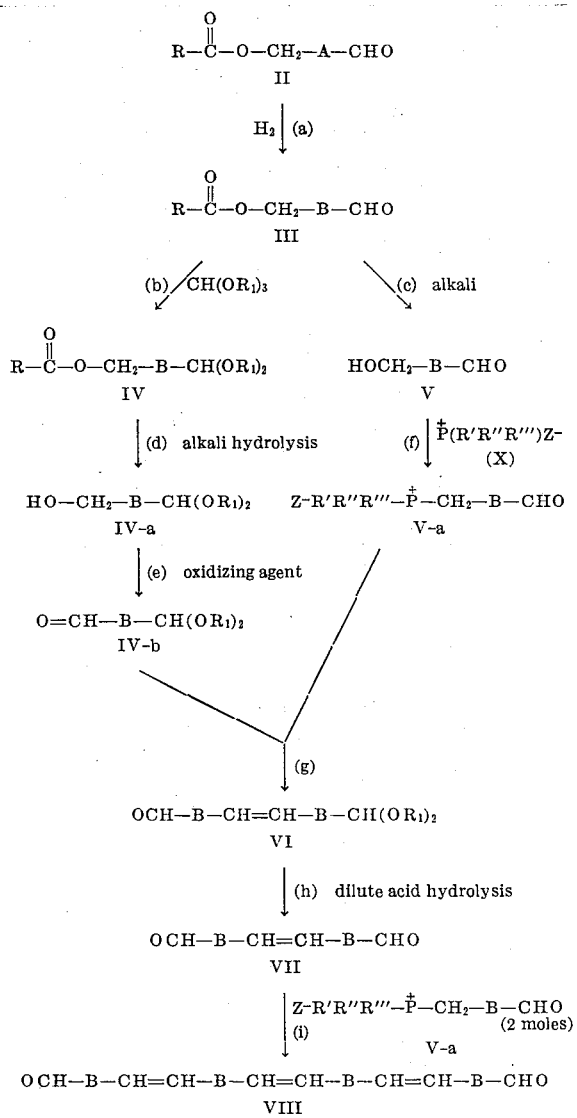

wherein A is a conjugated four to 14 carbon radical having one acetylene linkage therein and having at least one, preferably from one to six methyl side chains, B is the same as A with the one acetylene linkage reduced to an olefinic linkage, R is a hydrogen or lower alkyl radical containing from one to seven carbon atoms, $R_1$ is a lower alkyl radical containing from one to seven carbon atoms, R', R", R''' being an aryl radical containing six to 16 carbon atoms, an aralkyl radical containing from seven to 16 carbon atoms or a lower alkyl radical containing from 1 to 7 carbon atoms and Z is an anion of a mineral acid, e.g. Br—, Cl—, I— and $HSO_4$—.

The reduction of compounds of the formula II above to compounds of formula III above can be effected by catalytic hydrogenation in the presence of a catalyst which selectively reduces only the triple bond (acetylene linkage) to a double bond. For example, compounds of formula II above can be catalytically hydrogenated, in an inert solvent such as ethyl acetate, toluene or petroleum ether, in the presence of a selective hydrogenation catalyst, e.g., a palladium-lead catalyst in the presence of quinoline, of the type disclosed in the publication Helvetica Chimica Acta, 35,446 (1952).

The conversion of compounds of the formula III above to compounds of the formula IV-b above, is carried out by first hydrolyzing the ester linkage in the compounds of formula III above to form the hydroxy compound of formula IV-a above which is oxidized to the aldehyde of formula IV-b. During this procedure, the aldehyde group in formula III above is protected during the oxidizing step (e) by means of its being converted to an acetal group anytime before oxidation.

Compounds of formula III are converted into compounds of the formula V-a by first hydrolyzing the ester group in the compounds of formula III to the hydroxy compound of formula V and thereafter reacting the hydroxy compound of formula V above, if desired, after its conversion into a halogeno compound, with a phosphine compound of formula X, as in step (f). In carrying out the reaction of step (f), compounds of formula V or halogeno derivatives thereof are reacted with a phosphine of the formula X in an inert solvent (such as, for example, a lower alkanol such as methanol or ethanol) in the presence of a proton donor or with an acid addition salt of the phosphine of formula X or a diarylmonoalkyl phospine. Proton donors which can be employed in the above process include inorganic acids such as hydrohalic acids or sulfuric acid. In this manner, the compounds of the formula V-a are formed.

During the reaction of step (f), it is preferable to first form the acetal of compound V, by means of utilizing a conventional acetal forming agent, so as to protect the aldehyde group of compound V during its reaction with the phosphine of formula X. In this case the acetal functional group would be converted to the corresponding aldehyde group by hydrolysis during step (h).

Compound of formula IV-b and compounds of formula V-a or an acetal thereof can be reacted as in step (g) to form the chain lengthened compounds of formula VI. This reaction is preferably carried out in the presence of a solvent, i.e., an organic solvent substantially inert to the reactants such as a lower alkanol solvent having from 1 to 7 carbon atoms, i.e., methanol, ethanol, etc. di-methylformamide, acetonitrile or benzene. The preferred solvents are methanol and benzene. The reaction is conducted in the presence of a strong base, such as an alkali metal hydride, e.g., sodium hydride, potassium hydride, an alkali metal amide, e.g., sodium amide, alkali metal-lower alkoxide, preferably sodium methoxide, or a solution of an alkali metal hydroxide in a lower alkanol, e.g., KOH in methanol. This reaction can be carried out at room temperature. However, temperatures as high as the reflux temperature of the solvent or as low as the freezing point of the solvent can be effectively employed. In carrying out the reaction of step (g), one mole of the compounds of formula IV-b can be reacted with one mole of the compound of formula V-a if desired. However, a molar excess of the compound of formula IV-a or the compounds of formula V-a can be utilized.

Compound VI can be converted to the dialdehyde compounds of this invention ( compounds of formula VII above) by any conventional acid hydrolysis to hydrolyze the acetal radical to the corresponding aldehyde. If desired, the compounds of formula VII above can be further chain-lengthened by reacting the compound of formula VII above with the phosphonium salt of compound V-a above as in set (i). This reaction can be carried out in the same manner as step (g) except that at least two moles of the compound of formula V-a or of an acetal thereof should be utilized per mole of the compounds of formula VII above. Alternatively, compounds of formula VII above can be chain-lengthened by reaction with a vinyl ether or a propenyl ether, preferably a lower alkyl ether.

In carrying out the reaction of step (g), a phosphonium salt containing the same B-radical as the B-radical in compound IV-b can be utilized. However, if desired, the phosphonium salt containing a different B-radical than the B-radical in compound IV-b can be utilized in carrying out step (g) In carrying out step (i), the phosphonium salt that is utilized can be the same phosphonium salt as that used in step (g) or a different phosphonium salt than is utilized in step (g).

This invention is further illustrated by the following examples which are illustrative but not limitative thereof.

EXAMPLE 1

Preparation of 2,6,11,15-tetramethyl-hexadeca-heptaene-(2,4,6,8,10 12,14-dial-(1,16) [C 20 dialdehyde].

A. Preparation of 8,8-dimethoxy-3,7-dimethyl-octa-trien-(2,4,6)-al-1.

All trans 8,8-dimethoxy-3,7-dimethyl-octa-trien-(2,4,6)-al-(1) can be manufactured in an advantageous manner as follows:

71 g. of 8-acetoxy-2,6-dimethyl-octa-trien-(2,4,6-al-(1) are suspended in 15 ml. of methanol and 41 ml. of orthoformic acid trimethyl ester and, after the addition of 3.5 ml. of a 1 percent solution of p-toluenesulphonic acid in methanol, stirred at 20°–25° C. for 4 hours. The acetoxy acetal [absorption maximum (in petroleum ether) 276 m$\mu$] present in the clear solution is not isolated, but is directly alkaline-saponified. A solution of 37.7 g. of sodium hydroxide in 34 ml. of water and 180 ml. of methanol is added dropwise thereto with stirring at 0°–5° C. within 20 minutes. The reaction mixture is further stirred at 5°–10° C. for 15 minutes, immediately thereafter poured into 2.5 liters of icecold 5 percent by weight potassium hydrogen carbonate solution and extracted twice with ether (500 and 800 ml.). The ether phase is washed twice with fresh potassium hydrogen carbonate solution and dried over potassium carbonate.

The hydroxy acetal [absorption maximum (in petroluem ether) 276 m$\mu$] containing ether solution is subsequently treated with 300 g. of manganese dioxide and stirred or shaken at 10° C. for 60 hours, then filtered and evaporated. The residual oil is taken up in 10 ml. of petroleum ether (boiling range 40°–45° C.) and cooled in the ice-bath for six hours. The orange-yellow all trans 8,8-dimethoxy-3,7-dimethyl-octa-trien-(2,4,6)-al-(1) crystallizing out melts at 57°–58° C. after recrystallization from petroleum ether: absorption maxima (in petroleum ether) 300 (shoulder), 313, 327 m$\mu$; $E_{1cm}^{1\%}$ = 1380, 2000, 1780.

B. Preparation of (3,7-dimethyl-8-oxo-octatrien-(2,4,6)-yl)-triphenyl-phosphonium bromide.

A mixture of 10.5 ml. of dimethylformamide and 45 ml. of methylene chloride is treated with stirring at −20° C. with 6.5 ml. of phosphorous tribromide and thereupon within 20 minutes with a solution of 16.6 g. of 8-hydroxy-2,6-dimethyl-octa-trien-(2,4,6)-al-(1) in 25 ml. of methylene chloride. The reaction mixture is stirred at −10° C. for one hour, then poured in ice-water and extracted with 300 ml. of ether. The ether extract is washed twice with ice-water, three times with ice-cold 10 percent potassium hydrogen carbonate solution and twice with ice-water, briefly dried over sodium sulphate and immediately evaporated under reduced pressure at 20° C. The residual 8-bromo-2,6-2,6-dimethyl-octa-trien-(2,4,6)-al-(1) crystallizes after trituration with a little ether. M.p. 68°–70° C; absorption maximum (in petroleum ether) 311 m$\mu$. Without further purification, the unstable compound is immediately dissolved in 50 ml. of methylene chloride and treated with 26 g. of triphenyl-phosphine. In doing so, the solution warms up to boiling. After 1 to 1.½ hours, 200 ml. of acetic acid ethyl ester are slowly added while scratching with a glass rod. The (3,7-dimethyl-8-oxo-octa-trien-(2,4,6)-yl)-triphenyl-phosphonium bromide crystallizing out is filtered off in the cold after standing for 12 hours. M.p. 203°–205° C; absorption maximum (in ethanol) 315 m$\mu$; $E_{1cm}^{1\%}$ = 970.

C. Preparation of dialdehyde.

60 g. of (3,7-dimethyl-8-oxo-octatrien-(2,4,6)-yl)-triphenyl-phosphonium bromide in 160 ml. of abs. methanol are treated with 20 ml. of orthoformic acid etrimethyl ester and a solution of 0.1 g. of p-toluenesulphonic acid and 0.1 ml. of 85 percent phosphoric acid in 20 ml. of abs. methanol and allowed to stand at room temperature for 18 hours. The reaction mixture is thereafter treated with 2 ml. of pyridine and subsequently simultaneously with a solution of 21 g. of 8,8-dimethoxy-3,7-dimethyl-octa-trien-(2,4,6)-al-(1) in 100 ml. of abs. benzene and a sodium methylate solution from 4 g. of sodium and 50 ml. of abs. methanol. The mixture is heated at 50° C. for four hours, then cooled and, after the addition of 70 g. of ice, partitioned between petroleum ether (boiling range 40°–45° C.) and 85 percent methanol. The petroleum ether phase is washed several times with water, dried and evaporated. The residual crude 1,1,16,16-tetramethoxy-2,6,11,15-tetramethyl-hexadecaheptaene-(2,4,6,8,10,12,14) is dissolved in 300 ml. of acetone and, after the addition of 15 ml. of 1-N sulphuric acid, heated to boiling for 30 minutes. The 2,6,11,15-tetramethyl-hexadecaheptane-(2,4,6,10,12,14)-dial-(1,16) which separates out melts at 190°–191° C. after recrystallization from acetic acid ethyl ester; violet, metalically shining leaflets; absorption maxima (in chloroform) 267, 455, 483 m$\mu$; $E_{1cm}^{1\%}$ = 580, 3970, 3840.

By extraction with methylene chloride and isomerisation by exposure to light in the presence of iodine, further fractions of this aldehyde may be obtained from the filtrate.

According to the same mode of procedure described above, there can further be manufactured:

from 2 mol of (3-methyl-6-oxo-hexa-dien-(2,4)-yl)-triphenyl-phosphonium bromide and 1 mole of 2,7-dimethyl-octa-trien-(2,4,6)-dial-(1,8) there was produced 4,8,13,17-tetramethyl-eicosa-nonaene-(2,4,6,8,10,12,14,16,18)-dial-(1,20) [C$_{24}$-dialdehyde]; violet needles: m.p: 226°–227° C; absorption maxima: (in chloroform) 300, 492, 523 m$\mu$; $E_{1cm}^{1\%}$ = 660, 3750, 3460, from 2 mole of (3,7-dimethyl-8-oxo-octa-trien-(2,4,6)-yl) triphenyl-phosphonium bromide and 1 mole of 2,7-dimethyl-octa-triene-(2,4,6)-dial-(1,8) there was produced 2,6,10,15,19,23-hexamethyl-tetracosa-undecaene-(2,4,6,8,10,12,14,16,18,20,22)-dial-(1,24) [C$_{30}$-dialdehyde]; violet needles; m.p. 233°–235° C.; absorption maxima: (in chloroform) 329, 520, 552 m$\mu$; $E_{1cm}^{1\%}$ = 745, 3590, 3050, from 2 mole of (3,7-dimethyl-10-oxo-deca-tetraen-(2,4,6,8)-yl)-triphenylphosphonium bromide and 1 mole of 2,7-dimethyl-octa-triono-(2,4,6) -dial-(1,8), there was produced 4,-8,12,17,21,25-hexamethyl-octacosa-tridecaene-(2,4,6,8,10,12,14,16,18,20,22,24,26)-dial-(1,28) [$C_{34}$-dialdehyde]: violet needles; m.p. 239°–240° C. absorption maxima: (in chloroform) 356, 541 m$\mu$; $E_{1cm}^{1\%}$ = 760, 3060, from two mole of (3,7-dimethyl-8-oxo-octa-trien-(2,4,6)-yl)-triphenyl-phosphonium bromide and 1 mole of 2,6,11,15-tetramethyl-hexadecaheptaene-(2,4,6,8,10,12,14)-dial-(1,16), there was produced -2,-6,10,14,19,23,27,31-octamethyl-dotriaconta-penta-decaene-(2,4,6,8,10,12,14,16,18,20,22,24,26,28,30)-dial-(1,32) [$C_{40}$-dialdehyde]; violet crystals; m.p. 261°–263° C.; absorption maxima (in chloroform) 380, 556 m$\mu$; $E_{1cm}^{1\%}$ = 810, 2770.

Examples 2 and 3 illustrate the preparation of starting materials for the above which are not known.

EXAMPLE 2

Preparation of [3-methyl-6-oxo-hexa-dien-2,4 yl]-triphenyl-phosphonium bromide.

(3-methyl-6-oxo-hexa-dien-(2,4)-yl)-triphenyl-phosphonium bromide can be manufactured in an advantageous manner as follows:

42.5 g. of 6-hydroxy-4-methyl-hexa-dien-(2,4)-al-(1) is reacted with 21.5 ml. of phosphorous tribromide and extracted with ether in the manner described in part B of Example 1. The ether extract which contained the unstable 6-bromo-4-methyl-hexadien-(2,4)-al-(1) is, however, not evaported but remains in a cold state and is treated with a solution of 88 g. of triphenyl-phosphine in 100 ml. of methylene chloride. The (3-methyl-6-oxohexa-dien-(2,4)-yl)-triphenyl-phosphonium bromide, initially oily, crystallized after tritaration. This phosphonium bromide salt separates out after standing at room temperature for two hours. The salt is recrystallized from a mixture of 350 ml. of methylene chloride and 1.1 liters of acetic acid ethyl ester. M.p. 200°–202° C. (dec.); absorption maxima (in ethanol) 268 (shoulder), 274 m$\mu$; $E_{1cm}^{1\%}$ =610, 630.

EXAMPLE 3

Preparation of [3,7-dimethyl-10-oxo-deca-tetraean-(2,4,6,8)-yl]- triphenyl phosphonium bromide.

A. Preparation of 10-acetoxy-4,8 dimethyl-deca-trien-(2,4,8) yn-(6)-al-1.

280 g. of 8-acetoxy-1,1-diethoxy-2,6-dimethyl-octa-dien-(2,6)-yne-(4) was dissolved in 300 ml. of benzene and treated dropwise at 30°–35° C. simultaneously with 85 g. of ethyl vinyl ether and 50 ml. of a 10 percent solution of anhydrous zinc chloride in acetic acid ethyl ester. The reaction solution is left to stand at room temperature for 18 hours. Subsequently, 75 g. of anhydrous sodium acetate in 750 ml. of 87 percent acetic acid are added. Then it is heated to 95° C., held at this temperature for four hours, poured on five liters of ice-water and extracted with ether. The ether extract is washed with sodium hydrogen carbonate and neutralized with water, dried over sodium sulphate and evaporated. The residue is dissolved in 135 ml. of ether and cooled to −20 ° C. The 10-acetoxy-4,8-dimethyl-deca-trien-(2,4,8)-yn-(6)-al-(1) which crystallizes out melts at 31°–32° C. U.V. maxima (in petroleum ether) 310 (shoulder), 325, 342 m$\mu$; $E_{1cm}^{1\%}$ = 1350, 1590, 1355.

B. Preparation of 10-acetoxy-4,8-dimethyl-deca-tetraen-(2,4,6,8)-al-(1).

57 g. of 10-acetoxy-4,8-dimethyl-deca-trien-(2,4,8)-yn-(6)-al-(1) were dissolved in 300 ml. of toluene and, after the addition of Lindlar catalyst [Helv.-Chim.-Acta 35 (1952) 446] and 0.5 ml. of quinoline, hydrogenated up to the uptake of 1.05 equivalents of hydrogen. The catalyst is filtered off. The filtrate is successively washed with 0.5-N sulphuric acid, potassium hydrogen carbonate solution and water, dried over sodium sulphate and treated with a solution of 0.2 g. of iodine in 50 ml. of toluene. The toluene solution is left to stand at room temperature for 18 hours. It is subsequently successively washed with 5 percent sodium thiosulphate solution and water, dried over sodium sulphate and evaporated under reduced pressure. The residue is taken up in 30 ml. of isopropyl alcohol and cooled to −20° C. The 10-acetoxy-4,8-dimethyl-deca-tetraen-(2,4,6,8)-al-(1) which crystallizes out melts at 64°–66° C. U.V. maxima (in petroleum ether) 318, 333, 350 m$\mu$; $E_{1cm}^{1\%}$ = 1790, 2860, 2700.

C. Preparation of 10-hydroxy-4,8-dimethyl-deca-tetraen-(2,4,6,8)-al-1.

22.3 g. of finely powdered 10-acetoxy-4,8-dimethyl-decatetraen-(2,4,6,8)-al-(1) are suspended in 150 ml. of methanol and treated with vigorous stirring at 0°–2° C. within 15 minutes with a solution of 4 g. of sodium hydroxide in 4 ml. of water and 40 ml. of methanol. The reaction mixture is further stirred at 0° for 10 minutes, adjusted at this temperature to pH 7-8 with alcoholic hydrochloric acid and evaporated under reduced pressure at ca 30° C. The residue was partitioned between methylene chloride and water. The methylene chloride phase was washed with potassium hydrogen carbonate solution and water, dried over sodium sulphate and evaporated. The residue was dissolved in 1.5 liters of boiling ether. The solution was concentrated up to incipient crystallization and cooled to −20° C. The 10-hydroxy-4,8-dimethyl-deca-tetraen-(2,4,6,8)-al-(1) forms orange-colored crystals. M.p. 103°–105° C. [after sublimation: 104°–105° C.] ; absorption maxima (in petroleum ether) 319, 334, 351 m$\mu$; $E_{1cm}^{1\%}$ = 2160, 3360, 3170.

D. Preparation of phosphonium salt.

The aldehyde prepared in part C was reacted with phosphorous tribromide and triphenyl phosphine to form [3,7-dimethyl-10-oxo-deca-tetraen-(2,4,6)-yl]-triphenyl-phosphonium bromide in the manner of part B of Example 1. The melting point of this compound was 202°–204° C. (dec.); absorption maximum (in ethanol) 354 m$\mu$ $E_{1cm}^{1\%}$ = 1060.

Examples 4 through 19 are directed to the use of the compounds of formula I above as coloring agents in foodstuffs, pharmaceutical and cosmetic preparations.

EXAMPLE 4

Manufacture of canary-yellow colored dragees 10,000 dragee kernals each of 150 mg. are coated white up to a kernel weight of 190 mg. with sugar syrup, starch and talc.

30 g. of color preparation containing 300 mg. of the $C_{14}$-dialdehyde disclosed above are soaked with 30 g. of water, combined with a solution of 330 g. of sugar and 135 g. of water which has been heated to boiling and subsequently cooled to 60°–70° C., and homogenized. The hollow colored sugar solution is applied little by little to the white-colored dragees in the rotating coating-pan, sprayed with cold air. The dragees are polished in the usual manner. The color layer of one dragee (weight 225 mg., diameter 1 cm., thickness 3mm.) contains 0.03 mg. of $C_{14}$-dialdehyde.

The water-soluble preparation employed as color-donor is, for example, manufactured as follows:

1. g. of a polyene compound of formula I are dissolved in 100 ml. of chloroform and together with 100 mg. of tocopherol, 2g. of arachis oil and 2 g. of ascorbyl palmitate introduced into a solution of 60 g. of gelatin, 35 g. of sugar and 0.5 g. of calc. soda in 250 ml. of water and homogenized. The colored chloroform-containing gelatin emulsion is poured on a metal sheet and subsequently evaporated in vacuum. The dry product is broken into small pieces.

EXAMPLE 5
Manufacture of lemon-yellow confectionery 1. g. of commercial fondant mixture is homogenously mixed on a roller frame with a solution of 1.5 g. of color preparation containing 15 mg. of the $C_{14}$-dialdehyde disclosed above in 5 ml. of water. In order to achieve the desired fluidity of the mass, either invert-sugar syrup or powdered sugar is worked in as required. After heating the colored fondant, the pure yellow glaze is applied to articles of confectionary or poured into starch molds. The lemon-yellow fondant fillings which solidify in the starch molds are freed from starch dust and covered with chocolate.

EXAMPLE 6
Manufacture of lemon-yellow ice-cream 2 g. of color preparation containing 20 mg. of the $C_{14}$-dialdehyde disclosed above, are dissolved warm in 5 ml. of water and added to the raw materials (such as cream, milk, sugar, gelatin, aroma-substances) necessary for 1 liter of ice-cream. A lemon-yellow ice-cream is obtained.

EXAMPLE 7
Manufacture of lemon-yellow caramels 1.5 g. of color preparation containing 15 mg. of the $C_{14}$-dialdehyde, disclosed above, is dissolved in 5 ml. of water and added to 1 kg. of bon-bon mixture towards the end of the cooking process or during the subsequent processing and homogeneously worked in.

EXAMPLE 8
Manufacture of egg-yellow colored fats and oils 5. mg. of the $C_{20}$-dialdehyde prepared in Example 1 are dissolved warm in 1 liter of oil or fat, a beautiful egg-yellow coloring being achieved.

EXAMPLE 9
Manufacture of yellow-orange colored pasta 1 kg. of hard wheat-grain is intimately mixed in a mixing drum with 300-350 ml. of water in which 0.5 g. of color preparation containing 5 mg. of the $C_{20}$-dialdehyde prepared in Example 1 have been dissolved. The moist, spongy mass is brought into the desired form of pasta through suitable nozzles and dried.

EXAMPLE 10
Manufacture of carbonic acid-containing yellow-orange colored citrus soft drinks 4 g. of color preparation containing 40 mg. of $C_{20}$-dialdehyde prepared in Example 1 are dissolved in 20 ml. of warm water and homogenized with 100 g. of orange concentrate. After the addition of citric acid and sugar syrup, the colored orange concentrate is diluted to 10 liters with carbonic acid-containing water and filled into bottles having stirrup-closures.

EXAMPLE 11
Manufacture of orange-red colored suppositories 100 g. of suppository mixture are heated with 100 mg. of the crystallized $C_{24}$-dialdehyde prepared in Example 1 up to complete solution of the pigment. α-Tocopherol, BHT, BHA, gallates etc. can be admixed as antioxidants. After working-in the active substance, the orange-red fatty-mass is poured into the usual molds and allowed to cool.

EXAMPLE 12
Manufacture of red colored gelatin capsules 10 g. of color preparation containing 100 mg. of the $C_{30}$-dialdehyde prepared in Example 1 are dissolved warm in 30 ml. of water and mixed with a hot gelatin solution consisting of 650 g. of gelatin, 250 g. of glycerin (which can also be partially replaced by sorbitol or other carbohydrates) and 800 g. of water. The gelatin capsules are manufactured in the usual way, according to the dipping or press process, from this gelatin solution.

EXAMPLE 13
Manufacture of raspberry colored syrups and candied fruits

Per kg. of syrup or candied fruit, 2 g. of color preparation containing 20 mg. of the $C_{30}$-dialdehyde prepared in Example 1 are dissolved warm in 5 ml. of water and added to the syrup or to the candied fruit mixture towards the end of the thickening process.

EXAMPLE 14
Manufacture of red colored gelatin foods 2. of color preparation containing 20 mg. of the $C_{30}$-dialdehyde prepared in Example 1 are dissolved in 6 ml. of warm water and stirred into one liter of the warm, liquid gelatin solution consisting of the usual ingredients. The solution is poured into molds and allowed to cool.

The same amount of pigment powder can also be mixed dry with the gelatin pudding powder sufficient for 1 kg. of prepared gelatin pudding. The pigment particles dissolve, red colored gelatin desserts being obtained.

EXAMPLE 15
Manufacture of a reddish pastel-colored daytime cream 1 g. of color preparation containing 10 mg. of the $C_{30}$-dialdehyde prepared in Example 1 is dissolved in 65 ml. of warm water. The solution is emulsified into a salve base which consists of 15 g. of cetyl alcohol and octadecyl alcohol, 3 g. of spermacetti 1 g. of butyl stearate, 1 g. of lanolin, 5 g. of CETIOL, 2.8 g. of COROL, 8 g. of glycerin or propyleneglycol and 0.5 g. of perfume oil composition.

EXAMPLE 16
Manufacture of a bordeaux-red pudding mixture 2 g. of color preparation containing 20 mg. of the $C_{34}$-dialdehyde prepared in Example 1 are admixed with the pudding powder which is sufficient for 1 liter of ready-prepared pudding and [the mixture] is further processed as usual by stirring or boiling up with milk.

EXAMPLE 17
Manufacture of bordeaux-red colored yogurt 2. g. of color preparation containing 20 mg. of $C_{34}$-dialdehyde prepared in Example 1 are dissolved warm in 5 ml. of water, mixed with one liter of milk and processed to [give] yogurt in the usual manner.

EXAMPLE 18
Manufacture of a bordeaux-red marzipan mixture 10 mg. of cryst. the $C_{34}$-dialdehyde prepared in Example 1 are dissolved hot in 10 g. of almond oil and, still warm, worked manually or by machine into 1 kg. of marzipan mixture. If desired the marzipan mixture can also be colored with a water-soluble pigment preparation which, dissolved in a little water, is mixed with the marzipan mixture.

EXAMPLE 19

Manufacture of a ruby colored toothpaste 0.5 g. of pigment powder containing 5 mg. of $C_{40}$-dialdehyde prepared in Example 1 are dissolved in 2 ml. of water and homogeneously worked into 100 g. of white toothpaste of the usual composition. If desired, the same pigment preparation can also be added to the raw materials dissolved in water or converted into a paste with water.

EXAMPLE 20

This Example is directed to preparing 8-acetoxy-2,6-dimethyl-octa-trien-(2,4,6)-al-(1) which is utilized as a starting material in Example 1.

A. Preparation of ether.

175 g. of crude 5-(1-methoxy-1-methylethoxy)-3-methyl-pent-3-en-1-yne are introduced in a rapid stream into a solution of lithium amide in liquid ammonia.

The ammonia-alkaline lithium amide solution can be manufactured as follows:

0.5 g. of finely divided lithium are introduced with stirring into 600 ml. of liquid ammonia. After the addition of 0.5 g. of a iron (III) nitrate, compressed air is led into the solution for a few seconds. As soon as the blue color of the solution has disappeared, a further 7.1 g. of finely divided lithium are added. The evaporating ammonia is condensed in a condenser charged with acetone/dry ice and led back to the reaction mixture. [The mixture] is stirred until the blue color disappears [15 to 60 minutes.]

The dark clear reaction solution is stirred for 90 minutes, then treated with 170 ml. of dry toluene and immediately subsequently with 114 g. of 3-ethoxy-2-methylacrolein in a rapid stream and further stirred for 30 minutes. The mixture is subsequently neutralized by the addition of 80 ml. of glacial acetic in 200 ml. of toluene. The acid solution is conveniently added through a dropping funnel of which the exit tube dips into the reaction mixture. The ammonia is evaporated off, with stirring, until the temperature in the reaction vessel has risen to 40° C. The toluene is subsequently distilled off under reduced pressure. The residual 1-ethoxy-8-(1-methoxy-1-methylethoxy)-2,6-dimethyl-octa-2,6-dien-4-yn-3-ol is a light-brown oil. U.V. maximum [in ethanol]; 228 m$\mu$; $\epsilon$ = 18000; $n_D^{20}$ = 1.5120; $d$ = 1.002.

The 5-(1-methoxy-methylethoxy)-3-methyl-pent-3-en-1-yne employed as starting compound can be manufactured as follows: 96 g. of 3-methyl-pent-2-en-4-yn-1-ol are, after the addition of 0.5 ml. of 10 per cent methyl alcoholic p-toluenesulphonic acid, trated with stirring and cooling at 5° to 15° C. with 79 g. of isopropenyl methyl ether. The acetal is not isolated, but further processed directly.

B. Preparation of hydroxy compound.

270 g. of 1-ethoxy-8-(1-methoxy-1-methylethoxy)-2,6-dimethyl-octa-2,6-dien-4-yn-3-ol are dissolved in 400 ml. of toluene and, with cooling and strong stirring, treated with 50 ml. of 2 percent sulphuric acid and 50 ml. of methanol, in doing which the temperature should not exceed 25° C. The reaction mixture is subsequently stirred at 20° to 25° C. with nitrogen gassing for two hours. The toluene phase is separated, washed with 400 ml. of a 10 percent aqueous sodium sulphate solution and subsequently with 400 ml. of a 5 percent sodium hydrogen carbonate solution. The aqueous phases are separated and once more shaken out with 100 ml. of toluene. The combined toluene extracts are concentrated at 50° C. to a volume of 400 ml. The 2,6-dimethyl-8-hydroxy-octa-2,6-dien-4-yn-1-al dissolved in toluene can be acylated without isolation as described hereinafter. The toluene solution can also be completely evaporated and the residue crystallized from dibutyl ether. The 2,6-dimethyl-8-hydroxy-octa-2,6-dien-4-yn-1-al thus obtained melts at 32°–34° C.

C. Preparation of Ester.

The 2,6-dimethyl-8-hydroxy-octa-2,6-dien-4-yn-1-al dissolved in toluene obtained according to above is, after the addition of 180 ml. of pyridine, treated with stirring at 0° to 10° C. with 85 ml. of acetyl chloride in 100 ml. of toluene. After completion of the treatment, the reaction mixture is stirred at 20° to 25° C. for 30 minutes and subsequently thoroughly shaken with 200 ml. of water. The toluene phase is separated and successively washed at 20°–25° C. with 300 ml. of 10 percent aqueous sulphuric acid, 400 ml. of water and 200 ml. of water. The aqueous phase is separated and again shaken out twice with 50 ml. of toluene each time. The combined toluene solutions are evaporated under reduced pressure at 60° C. The residual crude 2,6-dimethyl-8-acetoxy-octa-2,6-dien-4-yn-1-al can be purified by distillation in high vacuum. The forerun going over at up to about 100° C. [external temperature 120° C., internal pressure 0.03 Torr.] consists chiefly of 3-methyl-5-acetoxy-pent-3-en-1-yne. The pure 2,6-dimethyl-8-acetoxy-octa-2,6-dien-4-yn-1-al melts at 36° to 37° C.

D. Hydrogenation of Ester.

5.0 g. of 2,6-dimethyl-8-acetoxy-octa-2,6-dien-4-yn-1-al are dissolved in 30 ml. of toluene and, after the addition of 0.4 g. of a palladium/calcium carbonate catalyst deactivated by addition of lead and quinoline [Helv. Chim. Acta. 35 (1952), 446], hydrogenated up to the uptake of 1.05 equivalents of hydrogen. The reaction solution, after separation of the catalyst, is successively washed with 0.5-N sulphuric acid, potassium hydrogen carbonate solution and water, then dried over sodium sulphate and treated with a solution of 0.02 g. of iodine in 2 ml. of toluene. The solution is allowed to stand at room temperature for 18 hours and is subsequently successively washed with a 5 percent sodium thiosulphate solution and water, then dried over sodium sulphate and evaporated under reduced pressure. The residual 2,6-dimethyl-8-acetoxy-octa-2,4,6-trien-1-al melts at 70° to 72° C. after recrystallization from ethyl ether/petroleum ether [boiling range 30° to 40° C.].

EXAMPLE 21

This Example is directed to the preparation of 8-hydroxy-2,6-dimethyl-octa-trien-(2,4,6)-al-(1). 2,6-dimethyl-8-hydroxy-octa-2,6-dien-4-yn-1-al-(1) was prepared in part B of Example 20 and was converted into 2,6-dimethyl-8-hydroxy-octa-2,4,6-dien-al (1) by partial hydrogenation in the exact manner set forth in part D of Example 20.

EXAMPLE 22

This Example is directed to preparing 6-hydroxy-4-methyl-hexadien-(2,4)-al-(1) which is utilized as starting material in Example 2.

A. Preparation of 6,6-diethoxy-3-methyl-hexen-(2)-yn-(4)-ol-(1).

To a Grignard solution (prepared from 61 g. of magnesium and 328 g. of ethyl bromide in 100 ml. of tetrahydrofuran and 100 ml. of benzene) was added at 0°C within 20 minutes a solution of 112.5 g. of trans-3-methyl-penten-(2)-yn-(4)-ol-(1) in 400 ml. of benzene. The reaction mixture was kept under reflux conditions for one hour. Within one hour and while stirring 180 g. of orthoformic acid triethyl ester were then added dropwise and the resulting mixture refluxed for 10 hours. The mixture was then poured into 2 kg. of ice and water and acidified to a pH of 6 by the addition of acetic acid. The benzene phase was separated and washed with water. After evaporation of the benzene there was obtained 6,6-diethoxy-3-methyl-hexen-(2)-yn-(4)-ol-(1) of boiling point 115°/0,1 mm; $n_D^{20} = 1,4820$; absorption maximum 225 m$\mu$ $E_{1cm}^{1\%} = 780$.

B. Preparation of 6,6-diethoxy-3-methyl-hexadien-(2,4)-ol-(1)

39.6 g. of 6,6-diethoxy-3-methyl-hexen-(2)-yn-(4)-ol-(1) were dissolved in 200 ml. of petroleum ether (boiling range 80°–105°) and 64 ml. of ethanol and, after the addition of 5,2 g. of a palladium/calcium carbonate catalyst deactivated by addition of lead and quinoline [Helv. Chim. Acta 35 (1952), 446] and 6,4 ml. of 3-pyridine-methanol, hydrogenated at 23°C up to the uptake of 4,5 l. of hydrogen. After separation of the catalyst and evaporation of the solvent, the residue was distilled in a high vacuum. There was obtained 6,6-diethoxy-3-methyl-hexadien-(2,4)-ol-(1) of boiling point 93°–94°C/0,02 mm; $n_D^{20} = 1,4777$; absorption maximum 232 m$\mu$, $E_{1\ cm}^{1\%} = 617$.

C. Preparation of 6-hydroxy-4-methyl-hexadien-(2,4)-al-(1)

96 g. of 6,6-diethoxy-3-methyl-hexadien-(2,4)-ol-(1) were dissolved in 200 ml. of ether and treated with 10 ml. of 3N hydrochloric acid. The mixture was stirred at room temperature for 20 minutes and then treated with 20 g. of potassium carbonate. After filtration the filtrate was concentrated to 100 ml. and kept at −15°C overnight. The precipitation formed was separated, washed with cold ether and dried under reduced pressure at 35°. There was obtained all-trans-6-hydroxy-4-methyl-hexadien-(2,4)-al-(1) melting at 50°–60°. After recrystallisation from isopropyl ether the aldehyde melted at 65,5°–66,5°C.

EXAMPLE 23

This Example is directed to the preparation of 8-acetoxy-1,1-diethoxy-2,6-dimethyl-octadien-(2,6)-yne-(4), which is utilized as starting material in Example 3.

A solution of 1 ml. of 85 percent phosphoric acid and 1 g. of p-toluene-sulfonic acid in 75 ml. of absolute ethanol was dropped to a mixture of 206 g. of 8-acetoxy-2,6-dimethyl-octadien-(2,6)-yn-(4)-al-(1) and 155 g. of orthoformic acid triethyl ester, whereby the mixture was stirred, and by occasional cooling it was taken care that the reaction temperature did not exceed 30°C. The mixture was maintained at room temperature for 3 hours, then cooled to 0°C, treated with 30 g. of sodium hydrogen carbonate and stirred for 10 minutes. Additional 30 g. of sodium hydrogen carbonate and 200 ml. of ice-water were then added and the resulting mixture extracted with ether. The ether extract was washed twice with ether, dried over potassium carbonate and concentrated in vacuum. There was obtained 8-acetoxy-1,1-diethoxy-2,6-dimethyl-octadien-(2,6)-yn-(4)-al-(1), boiling at 50°/0,04 mm; absorption maxima: 263, 283 m$\mu$, $E_{1\ cm}^{1\%} = 810, 610$.

We claim:

1. 10-Acetoxy-4,8-dimethyl-deca-trien-(2,4,8)-yn-6-al-(1).
2. 10-Acetoxy-4,8-dimethyl-deca-tetraen-(2,4,6,8)-al-(1).
3. 10-Hydroxy-4,8-dimethyl-deca-tetraen-(2,4,6,8)-al-(1).
4. [3,7-dimethyl-10-oxo-deca-tetraen-(2,4,6,8)-yl]-tri-phenyl phosphonium acid addition salt of an acid selected from the group consisting of hydrogen iodide, hydrogen bromide, hydrogen chloride and sulfuric acid.

* * * * *

UNITED STATES PATENT OFFICE
CERTIFICATE OF CORRECTION

Patent No. 3,742,038           Dated June 26, 1973

Inventor(s) Hugo Gutmann and Ulrich Schwieter

It is certified that error appears in the above-identified patent and that said Letters Patent are hereby corrected as shown below:

Cover page, after [21] Appl. No.: 106,575, insert:

[30] Foreign Application Priority Data

January 21, 1966   Switzerland........856/66

Signed and sealed this 20th day of August 1974.

(SEAL)
Attest:

McCOY M. GIBSON, JR.                     C. MARSHALL DANN
Attesting Officer                         Commissioner of Patents